US012571937B2

(12) United States Patent
Xu et al.

(10) Patent No.: US 12,571,937 B2
(45) Date of Patent: Mar. 10, 2026

(54) VEHICLE SAFETY INSPECTION SYSTEM AND SAFETY INSPECTION METHOD

(71) Applicants: NUCTECH COMPANY LIMITED, Beijing (CN); NUCTECH (BEIJING) COMPANY LIMITED, Beijing (CN)

(72) Inventors: Yanwei Xu, Beijing (CN); Shangmin Sun, Beijing (CN); Chunguang Zong, Beijing (CN); Yu Hu, Beijing (CN); Yuan Ma, Beijing (CN)

(73) Assignees: NUCTECH COMPANY LIMITED, Beijing (CN); NUCTECH (BEIJING) COMPANY LIMITED, Beijing (CN)

( * ) Notice: Subject to any disclaimer, the term of this patent is extended or adjusted under 35 U.S.C. 154(b) by 314 days.

(21) Appl. No.: 18/260,008

(22) PCT Filed: Dec. 10, 2021

(86) PCT No.: PCT/CN2021/136983
§ 371 (c)(1),
(2) Date: Jun. 29, 2023

(87) PCT Pub. No.: WO2022/143098
PCT Pub. Date: Jul. 7, 2022

(65) Prior Publication Data
US 2024/0319401 A1 Sep. 26, 2024

(30) Foreign Application Priority Data
Dec. 31, 2020 (CN) .......................... 202011644448.9

(51) Int. Cl.
*G01V 5/22* (2024.01)
(52) U.S. Cl.
CPC .................................... *G01V 5/232* (2024.01)
(58) Field of Classification Search
CPC .......... G01V 5/22; G01V 5/232; G01V 5/222; G01V 5/0016; G01V 5/0008; G01V 5/271;
(Continued)

(56) References Cited

U.S. PATENT DOCUMENTS

| | | | |
|---|---|---|---|
| 7,483,511 B2 * | 1/2009 | Bendahan | G01V 5/232 378/57 |
| 2008/0123809 A1 * | 5/2008 | Tudor | G01V 5/271 378/57 |

(Continued)

FOREIGN PATENT DOCUMENTS

| | | |
|---|---|---|
| CN | 105445808 A | 3/2016 |
| CN | 105787495 A | 7/2016 |

(Continued)

OTHER PUBLICATIONS

Chinese Office Action dated Jun. 19, 2023 (with English translation), Chinese Patent Application No. 202011644448.9, 21 pages.
(Continued)

*Primary Examiner* — Irakli Kiknadze
(74) *Attorney, Agent, or Firm* — Knobbe, Martens, Olson & Bear, LLP

(57) ABSTRACT

A vehicle safety inspection system and method are provided. The vehicle safety inspection system includes: a scanning device mounted in an inspection region for scanning a detected vehicle; an imaging device for acquiring an image of the vehicle being driven into the inspection region; a recognition module for recognizing the image and determining a type of the vehicle according to a recognized image; a selection module for selecting a feature of a trunk of the vehicle according to a determined type of the vehicle; a position sensor for detecting a position of a predetermined part of the vehicle in the inspection region; and a controller for controlling the scanning device to scan and inspect the trunk when a front end section of the trunk of the vehicle is determined to enter a scanning region of the scanning device according to the feature and position of the vehicle.

19 Claims, 7 Drawing Sheets

(58) Field of Classification Search
CPC .............................. G01S 17/88; G01N 23/203;
G01N 23/20008; G01N 2223/3303; G01N
23/04; G01N 2223/03; G01N 2223/401;
G01B 11/00; G01B 11/04; G06Q 10/08;
G06Q 10/0838; B64F 1/368; G06M
1/101; G06T 7/001; G06T 7/0004; G06T
2207/10116; G06T 2207/30248; G08B
13/194; G01M 17/007
USPC .............................................. 378/57, 58, 62
See application file for complete search history.

(56) References Cited

U.S. PATENT DOCUMENTS

| | | | |
|---|---|---|---|
| 2013/0039462 A1* | 2/2013 | Morton .................. | G01V 5/224 |
| | | | 378/57 |
| 2016/0178790 A1* | 6/2016 | Li .............................. | G06T 7/60 |
| | | | 378/57 |
| 2017/0160168 A1* | 6/2017 | Xu ........................... | G01V 5/22 |

FOREIGN PATENT DOCUMENTS

| | | | |
|---|---|---|---|
| CN | 107479102 | A | 12/2017 |
| CN | 208206846 | U | 12/2018 |
| CN | 110244371 | A | 9/2019 |
| CN | 210038190 | U | 2/2020 |
| CN | 111279224 | A | 6/2020 |
| CN | 111694063 | A | 9/2020 |
| WO | WO 2015/020546 | A2 | 2/2015 |

OTHER PUBLICATIONS

International Search Report (with English translation) mailed Mar. 1, 2022, International Application No. PCT/CN2021/136983, 11 pages.

\* cited by examiner

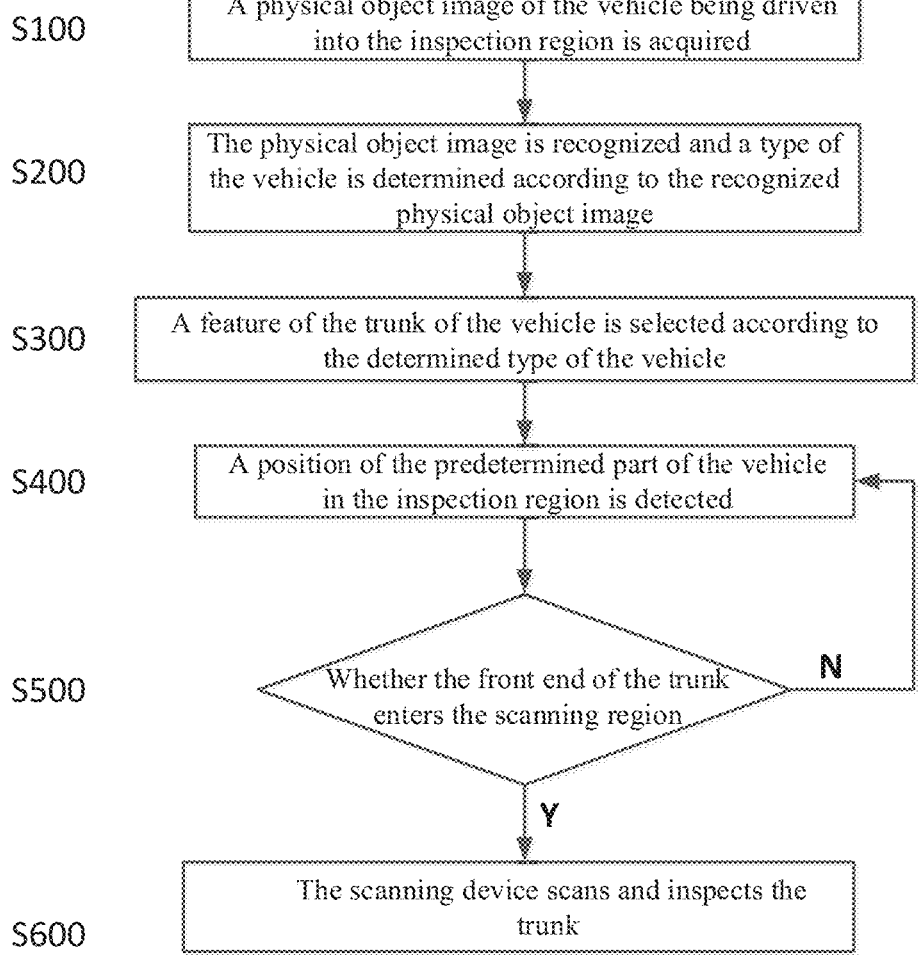

S100    A physical object image of the vehicle being driven into the inspection region is acquired S200    The physical object image is recognized and a type of the vehicle is determined according to the recognized physical object image S300    A feature of the trunk of the vehicle is selected according to the determined type of the vehicle S400    A position of the predetermined part of the vehicle in the inspection region is detected S500    Whether the front end of the trunk enters the scanning region          N

Y

S600    The scanning device scans and inspects the trunk

FIG. 9

VEHICLE SAFETY INSPECTION SYSTEM AND SAFETY INSPECTION METHOD

CROSS REFERENCE TO RELATED APPLICATION(S)

This application is a Section 371 National Stage Application of International Application No. PCT/CN2021/136983, filed on Dec. 10, 2021, entitled "VEHICLE SAFETY INSPECTION SYSTEM AND SAFETY INSPECTION METHOD", which claims priority to Chinese Patent Application No. 202011644448.9, filed on Dec. 31, 2020, the entire contents of which are incorporated herein in their entireties by reference.

TECHNICAL FIELD

Embodiments of the present disclosure relate to a vehicle safety inspection system, in particular to a vehicle safety inspection system used to perform a safety inspection on a trunk of a vehicle, and a safety inspection method of using the vehicle safety inspection system to inspect a trunk of a vehicle.

BACKGROUND

At present, people are increasingly selecting a private car such as a car for going out. Generally, a luggage item is subjected to safety inspection when a traditional public transport means is selected for going out. However, when using the private car such as the car for going out, the safety inspection for each car is not completely implemented due to a large operational difficulty in terms of safety inspection, leading to a great potential safety hazard. Especially, when the car enters a place such as a public security, a justice, a prison, a customs, a frontier inspection, an anti-smuggling and anti-narcotic, an airport, an important government organ, an important security agency, a military base, a consulate, an important person residence passageway, an important conference hall, and the like, there has been an increasing concern about inspecting whether a non-passenger area (such as an externally invisible front box and trunk) of the car contains a prohibited article such as a drug, a smuggled article, a control tool, a gun, a flammable and explosive article, and the like.

At present, the safety inspection method for a vehicle includes manual observation, which is inefficient and difficult to detect a hidden prohibited article. A reliability of a police dog or an odor extraction device in detecting an explosive device and some explosives is also not high.

A small vehicle safety inspection system has been developed, in which the vehicle is parked, the occupants get off the vehicle, and then an X-ray device moves the vehicle from front to rear to perform inspection imaging. In such detection method, since the X-ray inspection device is operated through manual control and whether contraband exists in the vehicle or not is subjectively judged through human eyes, human factors exist, a working efficiency is low and underreports exist, and a toll station or intersection with a large traffic flow is easy to queue for a long time to wait for inspection, leading to an obviously reduced traffic efficiency.

SUMMARY

According to embodiments of one aspect of the present disclosure, there is provided a vehicle safety inspection system, including: a scanning device mounted in an inspection region and configured to scan a detected vehicle; an imaging device configured to acquire a physical object image of the vehicle being driven into the inspection region; a recognition module configured to recognize the physical object image and determine a type of the vehicle according to a recognized physical object image; a selection module configured to select a feature of a trunk of the vehicle according to a determined type of the vehicle; a position sensor configured to detect a position of a predetermined part of the vehicle in the inspection region; and a controller configured to control the scanning device to scan and inspect the trunk in a case that a front end section of the trunk of the vehicle is determined to enter a scanning region of the scanning device according to a selected feature and the position of the vehicle.

According to an embodiment of the present disclosure, the controller is further configured to control the scanning device to stop scanning and inspection in a case that the position sensor detects that a rear end section of the vehicle leaves the scanning region of the scanning device.

According to an embodiment of the present disclosure, determining the type of the vehicle includes determining whether the vehicle is a hatchback or a notchback.

According to an embodiment of the present disclosure, the predetermined part of the vehicle is set as a front wheel rim or a rear wheel rim of a rear wheel lower than a chassis of the vehicle, and the feature of the trunk includes a first distance of the front end of the trunk beyond the front wheel rim or the rear wheel rim in a travelling direction of the vehicle, and in a case that a distance between the predetermined part located upstream of the scanning device in a travelling direction and a radiation beam of the scanning device is less than the first distance, the controller controls the scanning device to scan and inspect the trunk.

According to an embodiment of the present disclosure, if the recognition module determines that the vehicle is the notchback and the predetermined part is set as the front wheel rim, the selection module selects the first distance to be in a range of 5 to 25 centimeters, preferably approximately 10 centimeters. If the recognition module determines that the vehicle is the notchback and the predetermined part is set as the rear wheel rim, the selection module selects the first distance to be in a range of 40 to 60 centimeters, preferably approximately 45 centimeters.

According to an embodiment of the present disclosure, if the recognition module determines that the vehicle is the hatchback and the predetermined part is set as the front wheel rim, the selection module selects the first distance to be in a range of (−10) to 10 centimeters, preferably approximately −5 centimeters. If the recognition module determines that the vehicle is the hatchback and the predetermined part is set as the rear wheel rim, the selection module selects the first distance to be in a range of 30 to 50 centimeters, preferably approximately 35 centimeters.

According to an embodiment of the present disclosure, the controller is further configured to start to control the position sensor to detect a position of the rear wheel rim or the front wheel rim of the rear wheel when the position sensor detects that a front end section of the vehicle is more than 200 centimeters leaving away from the radiation beam of the scanning device in the travelling direction.

According to an embodiment of the present disclosure, the feature of the trunk includes a length of the trunk, and the predetermined part of the vehicle is set as the rear end section of the vehicle. In a case that a distance between the rear end section of the vehicle located upstream of the scanning device in a travelling direction and a radiation beam of the scanning device is less than the second distance, the controller controls the scanning device to scan and inspect the trunk.

According to an embodiment of the present disclosure, if the recognition module determines that the vehicle is the notchback, the selection module selects the second distance to be in a range of 90 to 110 centimeters, preferably approximately 100 centimeters.

According to an embodiment of the present disclosure, if the recognition module determines that the vehicle is the hatchback, the selection module selects the second distance to be in a range of 70 to 90 centimeters, preferably approximately 80 centimeters.

According to an embodiment of the present disclosure, the position sensor includes one of a region laser scanner, a multi-line laser sensor, and a single-line laser sensor.

According to an embodiment of the present disclosure, the position sensor is further configured to measure a traveling speed of the vehicle, and the controller controls a scanning frequency of the scanning device according to the traveling speed.

According to an embodiment of the present disclosure, the controller adjusts a proportion of a scanned image formed by the scanning device according to the traveling speed.

According to an embodiment of the present disclosure, the scanning device includes: two upright frames oppositely disposed on two sides of the inspection region; and a radiation source and an array detector respectively disposed on the two upright frames.

According to an embodiment of the present disclosure, the scanning device further includes two shielding walls respectively disposed on the upright frames to shield a radiation line from the radiation source.

According to embodiments of another aspect of the present disclosure, there is provided a safety inspection method of inspecting a vehicle by using the vehicle safety inspection system described above, including:

acquiring the physical object image of the vehicle being driven into the inspection region;

recognizing the physical object image and determining the type of the vehicle according to the recognized physical object image;

selecting the feature of the trunk of the vehicle according to the determined type of the vehicle;

detecting the position of the predetermined part of the vehicle in the inspection region; and controlling, in a case that a front end of the trunk of the vehicle is determined to enter the scanning region of the scanning device according to the selected feature and the position of the vehicle, the scanning device to scan and inspect the trunk.

According to an embodiment of the present disclosure, in a case that the position sensor detects that a rear end section of the vehicle leaves the scanning region of the scanning device, the scanning device is controlled to stop scanning and inspection.

According to an embodiment of the present disclosure, if the type of the vehicle is determined to be a notchback and the predetermined part is set as a rear wheel rim of a rear wheel of the vehicle lower than a chassis of the vehicle, in a case that a distance between the rear wheel rim located upstream of the scanning device in a travelling direction and a radiation beam of the scanning device is less than 40 to 60 centimeters, preferably approximately 45 centimeters, the controller controls the scanning device to scan and inspect the trunk.

According to an embodiment of the present disclosure, if the type of the vehicle is determined to be a notchback, and the predetermined part is set as a front wheel rim of a rear wheel of the vehicle lower than a chassis of the vehicle, in a case that a distance between the front wheel rim located upstream of the scanning device in a travelling direction and a radiation beam of the scanning device is less than 5 to 25 centimeters, preferably approximately 10 centimeters, the controller controls the scanning device to scan and inspect the trunk.

According to an embodiment of the present disclosure, if the type of the vehicle is determined to be a hatchback and the predetermined part is set as a rear wheel rim of a rear wheel of the vehicle lower than a chassis of the vehicle, in a case that a distance between the rear wheel rim located upstream of the scanning device in a travelling direction and a radiation beam of the scanning device is less than 30 to 50 centimeters, preferably approximately 35 centimeters, the controller controls the scanning device to scan and inspect the trunk According to an embodiment of the present disclosure, if the type of the vehicle is determined to be a notchback and the predetermined part is set as a front wheel rim of a rear wheel of the vehicle lower than a chassis of the vehicle, in a case that a distance between the front wheel rim located upstream of the scanning device in a travelling direction and a radiation beam of the scanning device is less than (−10) to 10 centimeters, preferably approximately −5 centimeters, the controller controls the scanning device to scan and inspect the trunk.

According to an embodiment of the present disclosure, if the type of the vehicle is determined to be a notchback and the predetermined part is set as a rear end section of the vehicle, in a case that a distance between the rear end section located upstream of the scanning device in a travelling direction and a radiation beam of the scanning device is less than 90 to 110 centimeters, preferably approximately 100 centimeters, the controller controls the scanning device to scan and inspect the trunk.

According to an embodiment of the present disclosure, if the type of vehicle is determined to be a hatchback and the predetermined part is set as a rear end section of the vehicle, in a case that a distance between the rear end section located upstream of the scanning device in a travelling direction and a radiation beam of the scanning device is less than 80 to 100 centimeters, preferably approximately 90 centimeters, the controller controls the scanning device to scan and inspect the trunk.

BRIEF DESCRIPTION OF THE DRAWINGS

FIG. 9 shows a block diagram of a safety inspection method according to an exemplary embodiment of the present disclosure.

DETAILED DESCRIPTION OF EMBODIMENTS

Figure 1:
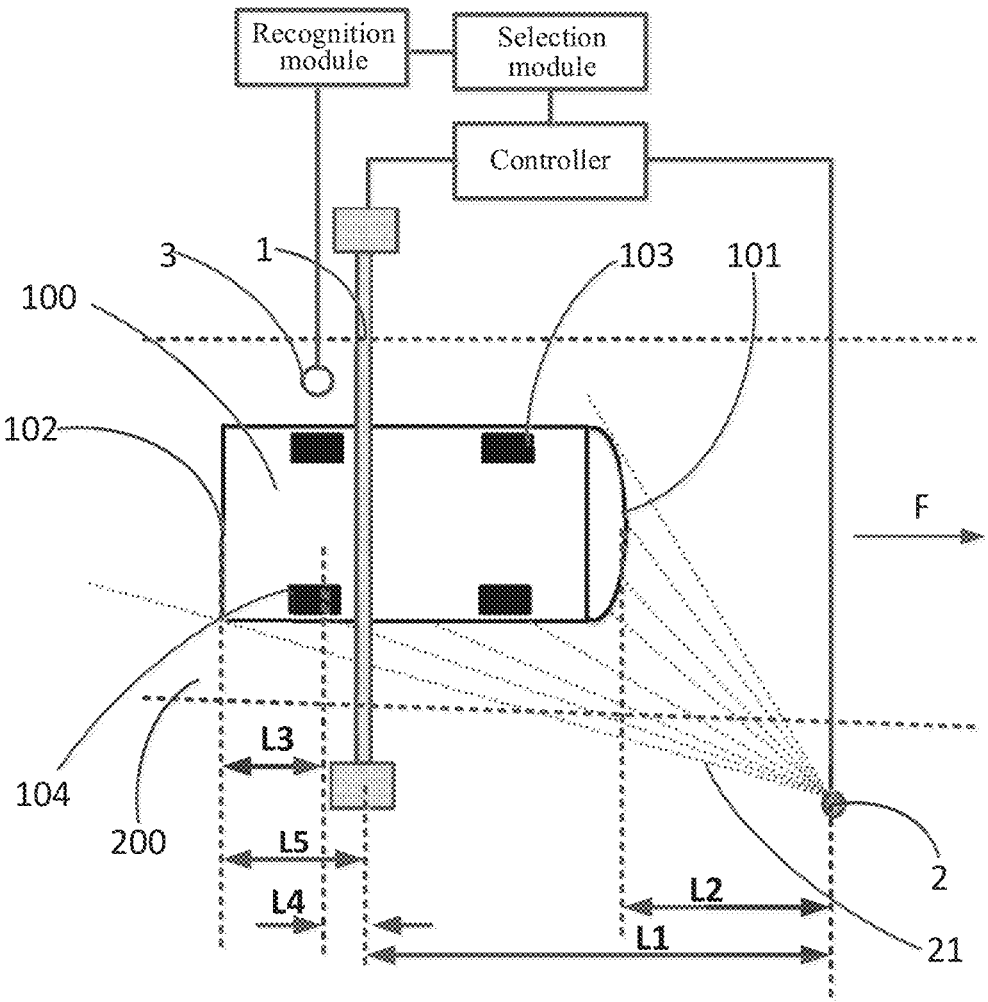
FIG. 1 shows a schematic diagram of a principle of a vehicle safety inspection system according to an exemplary embodiment of the present disclosure.

Technical solutions in embodiments of the present disclosure will be described clearly and completely with reference to the accompanying drawings. It is obvious that the embodiments described are only some embodiments of the present disclosure, rather than all embodiments. The following description of at least one exemplary embodiment is merely illustrative in nature and is in no way intended to limit the present disclosure, its application, or uses. All other embodiments, which may be derived by those of ordinary skill in the art from embodiments in the present disclosure without creative labor, are intended to be within the scope of the present disclosure.

In the following detailed descriptions, for purposes of explanation, numerous specific details are set forth in order to provide a thorough understanding of embodiments of the present disclosure. It is obvious, however, that one or more embodiments may be implemented without these specific details. In other instances, well-known structures and devices are shown in a diagram form to simplify the accompanying drawing. Techniques, methods, and apparatus known to one of ordinary skill in the relevant art may not be discussed in detail but are intended to be part of the description where appropriate.

In the description of the present disclosure, it is to be understood that directions or positional relationships indicated by directional terms such as "front, rear, upper, lower, left, right", "lateral, vertical, perpendicular, horizontal" and "top, bottom", etc., are generally based on directions or positional relationships shown in the accompanying drawings, and are based on a travelling direction of the vehicle, which are merely for convenience of describing the present disclosure and simplifying the description. In a case of not making a contrary explanation, these directional terms do not indicate and imply that the device or element referred to must have a particular direction or be constructed and operated in a particular direction, and therefore, should not be construed as limiting the scope of the present disclosure. Directional terms "inner, outer" refer to the inner and outer with respect to the profile of each component itself.

In the description of the present disclosure, it should be understood that the terms "first", "second" and the like are used for defining components, and are used only for the convenience of distinguishing corresponding components. If not otherwise stated, the above-mentioned terms do not have special meanings, and therefore, should not be construed as limiting the scope of the present disclosure.

According to an overall inventive concept of the present disclosure, there is provided a vehicle safety inspection system, including: a scanning device mounted in an inspection region and used to scan a detected vehicle; an imaging device used to acquire a physical object image of the vehicle being driven into the inspection region; a recognition module used to recognize the physical object image and determine a type of the vehicle according to a recognized physical object image; a selection module used to select a feature of a trunk of the vehicle according to a determined type of the vehicle; a position sensor used to detect a position of a predetermined part of the vehicle in the inspection region; and a controller used to control the scanning device to scan and inspect the trunk in a case that a front end of the trunk of the vehicle is determined to enter a scanning region of the scanning device according to a selected feature and the position of the vehicle.

According to another overall inventive concept of the present disclosure, there is provided a safety inspection method of inspecting a vehicle by using the vehicle safety inspection system described above, including: acquiring the physical object image of the vehicle travelling in the inspection region; recognizing the physical object image and determining the type of the vehicle according to the recognized physical object image; selecting the feature of the trunk of the vehicle according to the determined type of the vehicle; detecting the position of the predetermined part of the vehicle in the inspection region; and controlling, in a case that a front end of the trunk of the vehicle is determined to enter a scanning region of the scanning device according to to the selected feature and the position of the vehicle, the scanning device to scan and inspect the trunk.

Figure 2:
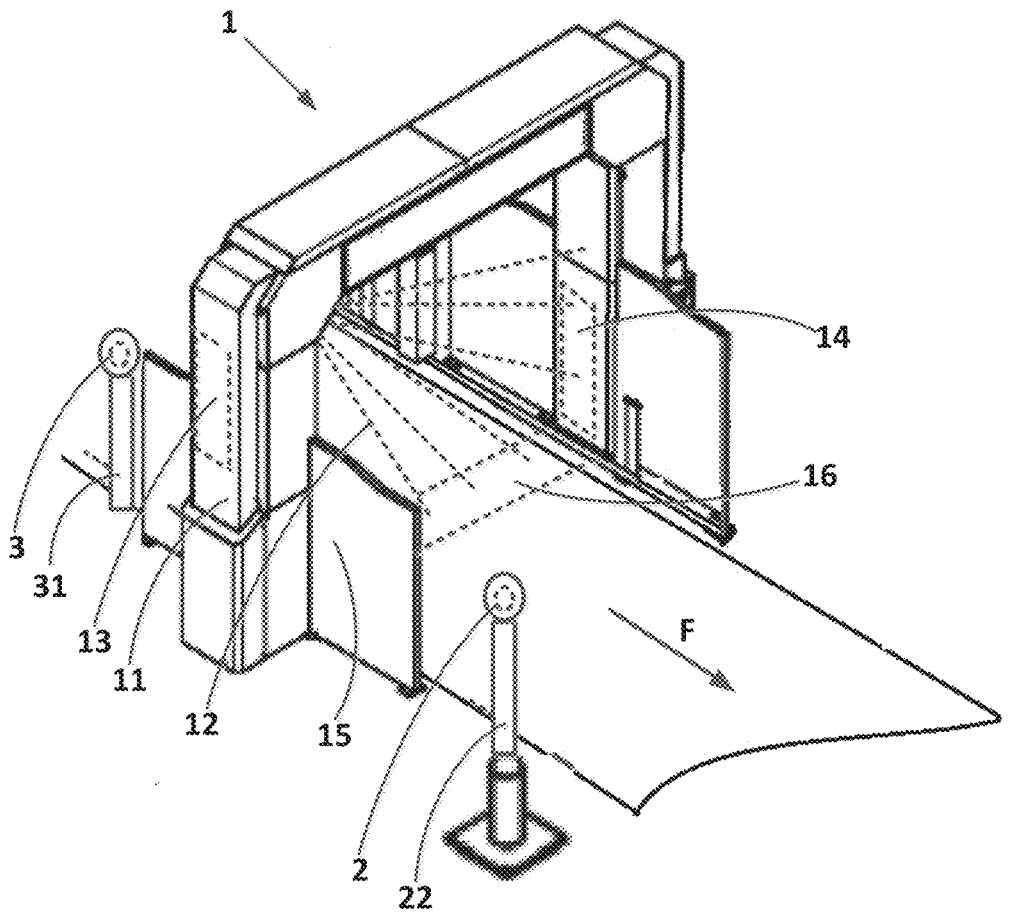
FIG. 2 shows a three-dimensional schematic diagram of a scanning device of a vehicle safety inspection system according to an exemplary embodiment of the present disclosure.
Figure 3:
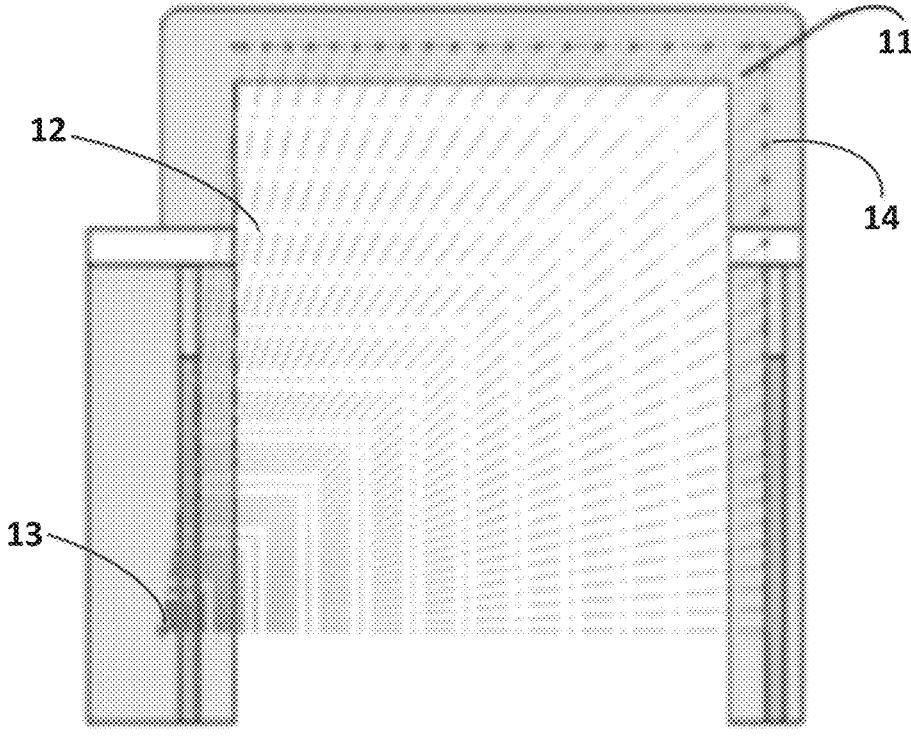
FIG. 3 shows a transverse cross-sectional view of a scanning device of a vehicle safety inspection system according to an exemplary embodiment of the present disclosure.

FIG. 1 shows a schematic diagram of a principle of a vehicle safety inspection system according to an exemplary embodiment of the present disclosure. FIG. 2 shows a three-dimensional schematic diagram of a scanning device of a vehicle safety inspection system according to an exemplary embodiment of the present disclosure. FIG. 3 shows a transverse cross-sectional view of a scanning device of a vehicle safety inspection system according to an exemplary embodiment of the present disclosure.

Figure 4:
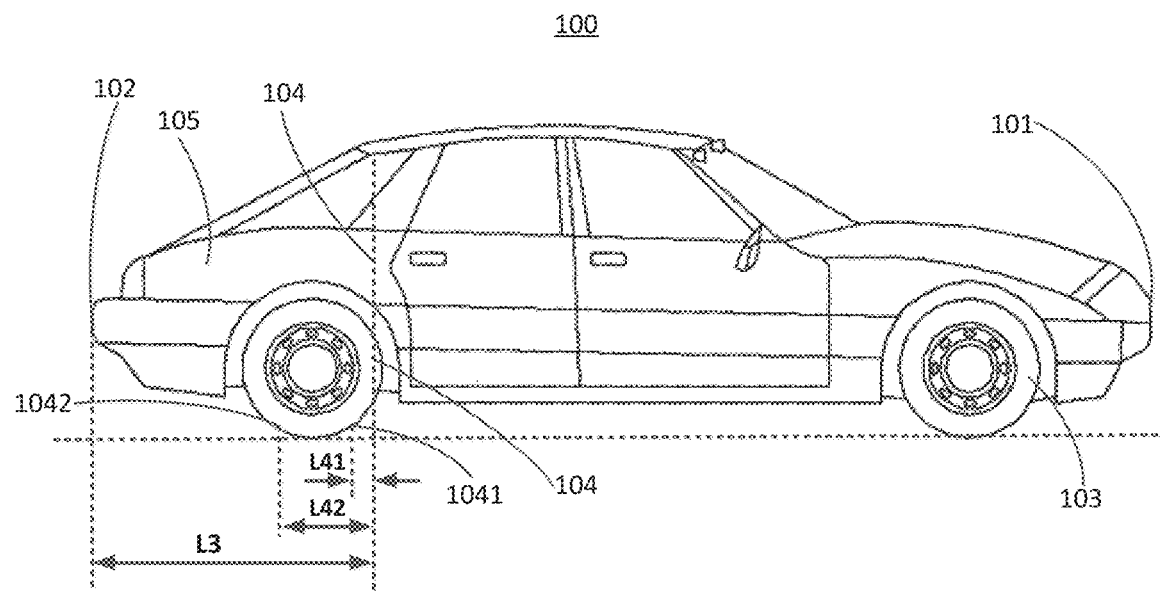
FIG. 4 shows a three-dimensional schematic diagram of a notchback according to an exemplary embodiment of the present disclosure.

The vehicle safety inspection system according to embodiments of the present disclosure is suitable for quickly and safely inspecting a trunk of a vehicle such as a family car. Through a safety inspection, whether the trunk of the vehicle contains a prohibited article such as a drug, an explosive, a control tool, a gun, and the like, may be determined. As shown in FIG. 4, a vehicle 100 is a notchback and includes a front end section 101, a rear end section 102, a front wheel 103, a rear wheel 104, and a trunk 105. The trunk 105 has a front end 106.

According to an exemplary embodiment of the present disclosure, as shown in FIG. 1 to FIG. 4, there is provided a vehicle safety inspection system, including a scanning device 1, an imaging device 3, a recognition module, a selection module, a position sensor 2, and a controller. The scanning device 1 is mounted in an inspection region 200 and is used to scan a detected vehicle. The imaging device 3 is used to acquire a physical object image of the vehicle 100 being driven into the inspection region 200. The imaging device 3 includes an area array camera, a region laser scanner, a multi-line laser sensor, or a linear array camera. The recognition module is used to recognize the physical object image and determine a type of the vehicle 100 based on the recognized physical object image, e.g., determining whether the vehicle 100 is a notchback or a hatchback. The selection module is used to select a feature of the trunk 105 of the vehicle according to the determined type of the vehicle 100. The position sensor 2 is used to detect a position of a predetermined part of the vehicle 100 in the inspection region 200. The controller is used to control the scanning device 1 to scan and inspect the trunk 105 in a case that the front end 106 of the trunk 105 of the vehicle is determined to enter a scanning region 16 of the scanning device 1 in a travelling direction F according to the selected feature and the position of the vehicle 100.

In an exemplary embodiment, the controller is further used to control the scanning device 1 to stop scanning and inspection in a case that the position sensor 2 detects that the rear end section 102 of the vehicle 100 leaves the scanning region 16 formed by a radiation beam 12 emitted by the scanning device 1.

According to the vehicle safety inspection system of embodiments of the present disclosure, the recognition module may recognize the type of the vehicle 100 and select the feature of the trunk 105 of the vehicle. In a case that the front end 106 of the trunk 105 of the vehicle is determined to enter the scanning region 16 of the scanning device 1 according to the selected feature and the position of the vehicle 100, the controller controls the scanning device 1 to scan and inspect the trunk 105. In this way, the scanning device 1 only performs a safety inspection on the trunk 105 of the vehicle 100, and different scanning and inspection timings may be selected according to different vehicle types. In a case that a driver and a passenger of the vehicle 100 do not need to get off the vehicle and the vehicle does not need to stop travelling, scanning and inspection of the vehicle may be achieved, thereby improving a safety inspection efficiency. In a case that the position sensor 2 detects that the rear end section 102 of the vehicle 100 leaves the scanning region 16 of the scanning device 1, the controller controls the scanning device 1 to stop scanning and inspection in preparation for a next safety inspection operation.

In an exemplary embodiment, referring to FIG. 2, the scanning device 1 includes: two upright frames 11 oppositely disposed on two sides of the inspection region 200; and a radiation source 13 used to emit a radiation beam (such as an X-ray beam) 12 and an array detector 14 used to receive the radiation beam 12 respectively disposed on the two upright frames 11, with the radiation beam 12 defining the scanning region 16. Furthermore, the scanning device 1 further includes a crossbeam disposed on the upright frames 11. The scanning device 2 may be installed on an outside of the inspection region 200 by using a support frame 22, and is located downstream of the scanning device 1 in the travelling direction F. In an exemplary embodiment, the scanning device includes a backscatter imaging device and/ or a transmission imaging device. In an exemplary embodiment shown in FIG. 3, the scanning device 1 is configured as a side view scanning device with the radiation source disposed on the upright frame. In an alternative embodiment, the scanning device is configured as a top view scanning device with the radiation source disposed on a horizontal frame on top of the two upright frames.

In an exemplary embodiment, the scanning device 1 further includes two shielding walls 15 respectively disposed on the upright frames 11 to shield radiation lines from the radiation source 13.

Figure 5:
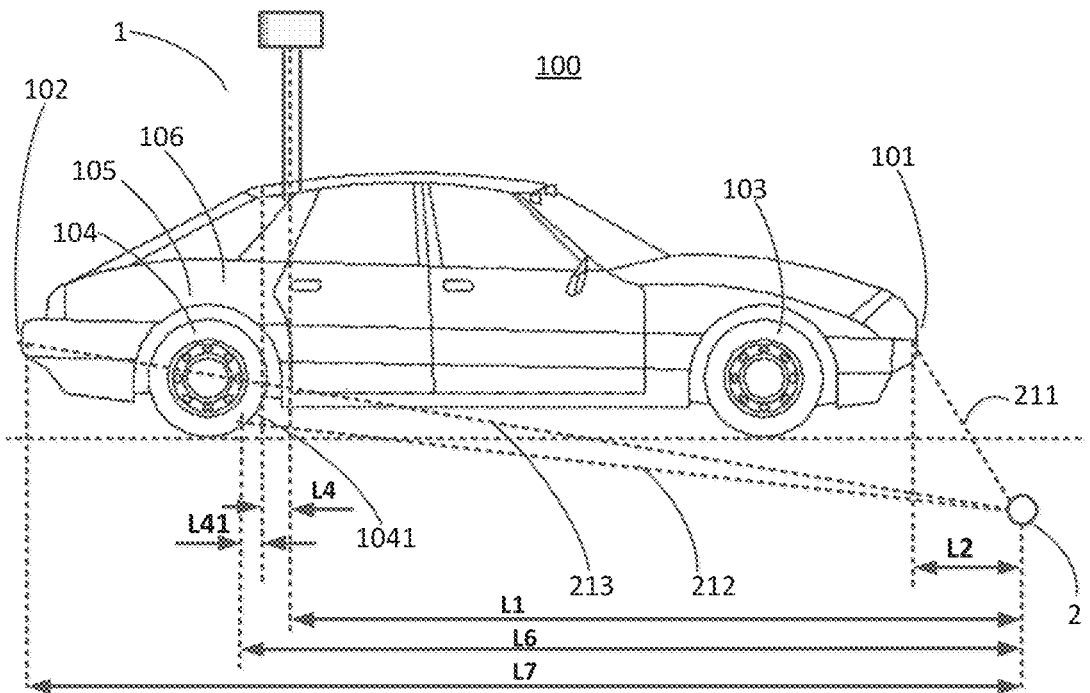
FIG. 5 shows a schematic diagram of a principle of scanning a trunk when an inspected notchback passes through a scanning device of a vehicle safety inspection system according to an exemplary embodiment of the present disclosure.
Figure 6:
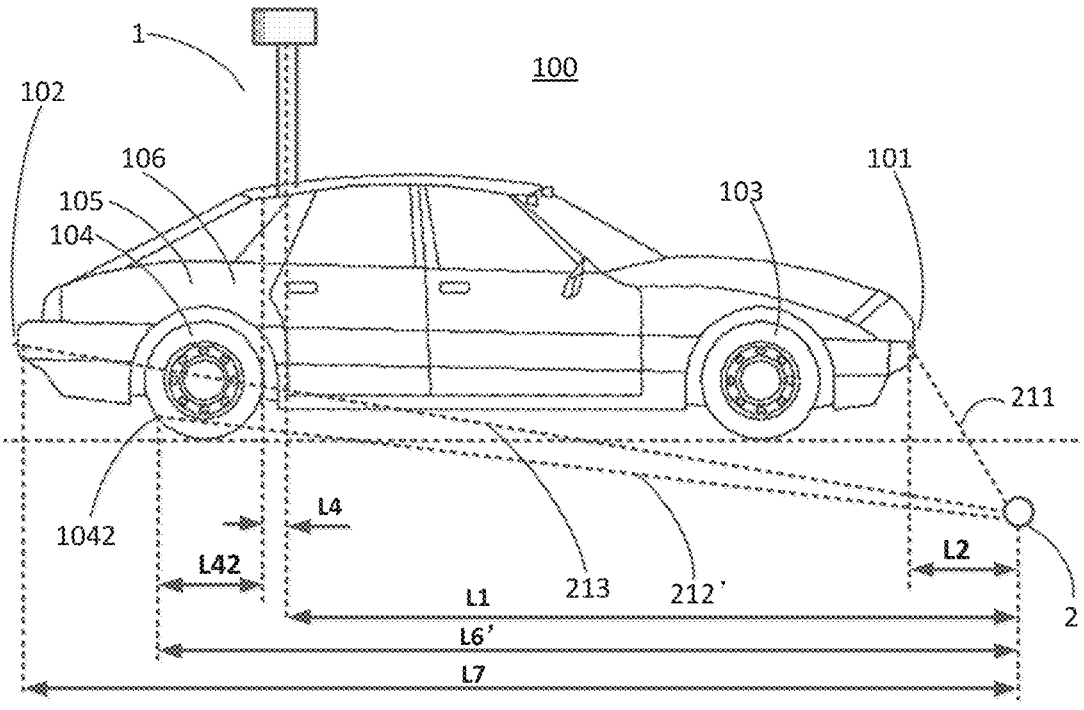
FIG. 6 shows a schematic diagram of a principle of scanning a trunk when an inspected notchback passes through a scanning device of a vehicle safety inspection system according to another exemplary embodiment of the present disclosure.

FIG. 4 shows a three-dimensional schematic diagram of a notchback according to an exemplary embodiment of the present disclosure. FIG. 5 shows a schematic diagram of a principle of scanning a trunk when an inspected notchback passes through a scanning device of a vehicle safety inspection system according to an exemplary embodiment of the present disclosure. FIG. 6 shows a schematic diagram of a principle of scanning a trunk when an inspected notchback passes through a scanning device of a vehicle safety inspection system according to another exemplary embodiment of the present disclosure.

In an exemplary embodiment, as shown in FIG. 1, and FIG. 4 to FIG. 6, the position sensor 2 includes a laser sensor. One laser sensor is used to measure a distance L2 between the front end section 101 of the vehicle 100 and the laser sensor 2, a distance L6 or L6' between the rear wheel 104 of the vehicle 100 and the laser sensor 2, and a distance L7 between the rear end section 102 of the vehicle 100 and the laser sensor 2 in real-time during a detection process. The laser sensor includes, for example, any one of a region laser scanner, a multi-line laser sensor, and a single-line laser sensor. The laser sensor generally includes an emitter used to emit a laser beam 21 towards a target (such as a vehicle), and a receiver used to receive a laser reflected from the target. The laser sensor may directly acquire information such as a distance, an angle, a reflection intensity, a velocity, and the like of the target by detecting an echo signal of the emitted laser, and generate a multi-dimensional image of the target.

It may be understood that with the laser sensor as the position sensor 2 installed in place, a distance L1 between the laser sensor and the scanning device 1 in the travelling direction F is fixed. It may be preset that: a first laser 211 emitted by the emitter of the laser sensor is used to measure the first distance L2 between the front end section 101 of the vehicle 100 and the laser sensor in the travelling direction, a second laser 212 emitted by the emitter of the laser sensor is used to measure the second distance L6 between a front wheel rim 1041 of the rear wheel 104 of the vehicle 100 and the laser sensor in the travelling direction, and a third laser 213 emitted by the emitter of the laser sensor is used to measure the third distance L7 between the rear end section 102 of the vehicle 100 and the laser sensor in the travelling direction.

Since the front end 106 of the trunk 105 has no obvious feature on the outside, it is not easy to measure the position of the front end of the trunk. However, regardless of whether the vehicle 100 is a notchback or a hatchback, a position relationship between the rear wheel 104 of the vehicle 100 and the trunk 105 of the vehicle 100 is relatively fixed, and a distance between a center of the rear wheel 104 and the front end 105 of the trunk 104 is also relatively fixed. For ease of measurement, a position of the front wheel rim 1041 of the rear wheel 104 lower than the chassis of the vehicle in the inspection region 200 is measured by using the laser sensor. For example, it may be set to measure a part of the front wheel rim 1041 that is 10 to 15 centimeters above the ground. It may be understood that, as shown in FIG. 4, once preset, a distance L41 between the front wheel rim 1041 of the rear wheel 104 and the front end 106 of the trunk 105, and a distance L42 between a rear wheel rim 1042 of the rear wheel 104 and the front end 106 of the trunk 105, are basically fixed during the detection process. The controller may determine whether the front end 16 of the trunk 105 reaches the scanning region 16 of the scanning device 1 according to a distance between the front wheel rim 1041 of the rear wheel 104 and the scanning region 16 defined by the radiation beam 12 emitted by the scanning device 1, and may control the scanning device 1 to accurately scan and inspect the trunk 105.

In an exemplary embodiment, determining the type of the vehicle 100 includes determining whether the vehicle is a hatchback or a notchback. Generally speaking, a length of the trunk of the notchback is greater than a length of the trunk of the hatchback. For example, the length of the trunk of the notchback is in a range of 90 to 110 centimeters, while the length of the trunk of the hatchback is in a range of 70 to 90 centimeters. Furthermore, a distance between the rear wheel of the notchback and the front end of the trunk is also different from a distance between the rear wheel of the hatchback and the front end of the trunk. In an embodiment, the predetermined part of the vehicle 100 is set as a front wheel rim 1041 or a rear wheel rim 1042 of the rear wheel 104 lower than the chassis of the vehicle. The feature of the trunk 105 includes a first distance of the front end 106 of the trunk beyond the front wheel rim 1041 or the rear wheel rim 1042 of the rear wheel 104 of the vehicle in the travelling direction F of the vehicle 100. Since the distance L41 between the front wheel rim 1041 of the rear wheel 104 and the front end 106 of the trunk 105 or the distance L42 between the rear wheel rim 1042 of the rear wheel 104 and the front end 106 of the trunk 105 is fixed, a relative position between the front end 106 of the trunk 105 and the scanning region 16 of the scanning device 1 may be determined by measuring the position of the front wheel rim 1041 or the rear wheel rim 1042 of the rear wheel 104, which is used as the predetermined part, in the inspection region 200. It may be understood that as shown in FIG. 1, and FIG. 4 to FIG. 6, as the vehicle 100 travels in the travelling direction F, a distance L4 between the front wheel rim 1041 or the rear wheel rim 1042 of the rear wheel 104 and the radiation beam 12 of the scanning device 1 gradually decreases.

As shown in FIG. 5, in a case that the position of the front wheel rim 1041 of the rear wheel 104 in the inspection region 200 is measured, the distance L4 between the front end 106 of the trunk 105 and the scanning region 16 of the scanning device 1 is:

$$L4 = L6 - L41$$

In an embodiment, in a case that the distance L4 between the predetermined part (i.e., the front wheel rim 1041 or the rear wheel rim 1042 of the rear wheel 104) located upstream of the scanning device 1 in the travelling direction F and the radiation beam 12 of the scanning device 1 is less than the first distance, which is indicated that the front end 106 of the trunk 105 enters the scanning region 16, the controller controls the scanning device 1 to scan and inspect the trunk 105.

In an exemplary embodiment, as shown in FIG. 5, if the recognition module determines that the vehicle 100 is the hatchback and the predetermined part is set as the front wheel rim 1041, the selection module selects the first distance to be within in a range of 5 to 25 centimeters, preferably approximately 10 centimeters. That is to say, in a case that the distance L4 between the front wheel rim 1041 located upstream of the scanning device 1 in the travelling direction F and the radiation beam 12 of the scanning device

1 is less than 5 to 25 centimeters, preferably less than 10 centimeters, which is indicated that the front end 106 of the trunk 105 enters the scanning region 16, the controller controls the scanning device 1 to scan and inspect the trunk 105.

On the other hand, as shown in FIG. 6, in a case that the position of the rear wheel rim 1042 of the rear wheel 104 in the inspection region 200 is measured, the distance L4 between the front end 106 of the trunk 105 and the scanning region 16 of the scanning device 1 is:

$$L4 = L6' - L42$$

If the recognition module determines that the vehicle is the notchback and the predetermined part is set as the rear wheel rim 1042, the selection module selects the first distance to be within a range of 40 to 60 centimeters, preferably approximately 45 centimeters. That is to say, in a case that the distance L4 between the rear wheel rim 1042 located upstream of the scanning device 1 in the travelling direction F and the radiation beam 12 of the scanning device 1 is less than 40 to 60 centimeters, preferably less than 45 centimeters, which is indicated that the front end 106 of the trunk 105 enters the scanning region 16, the controller controls the scanning device 1 to scan and inspect the trunk 105.

Figure 7:
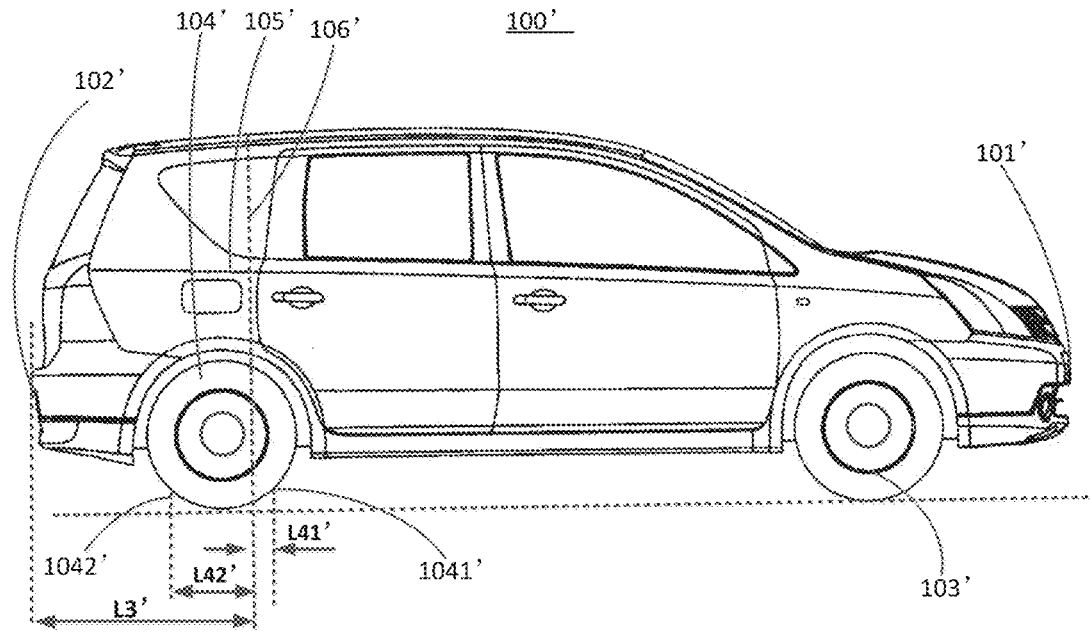
FIG. 7 shows a three-dimensional schematic diagram of a hatchback according to an exemplary embodiment of the present disclosure.
Figure 8:
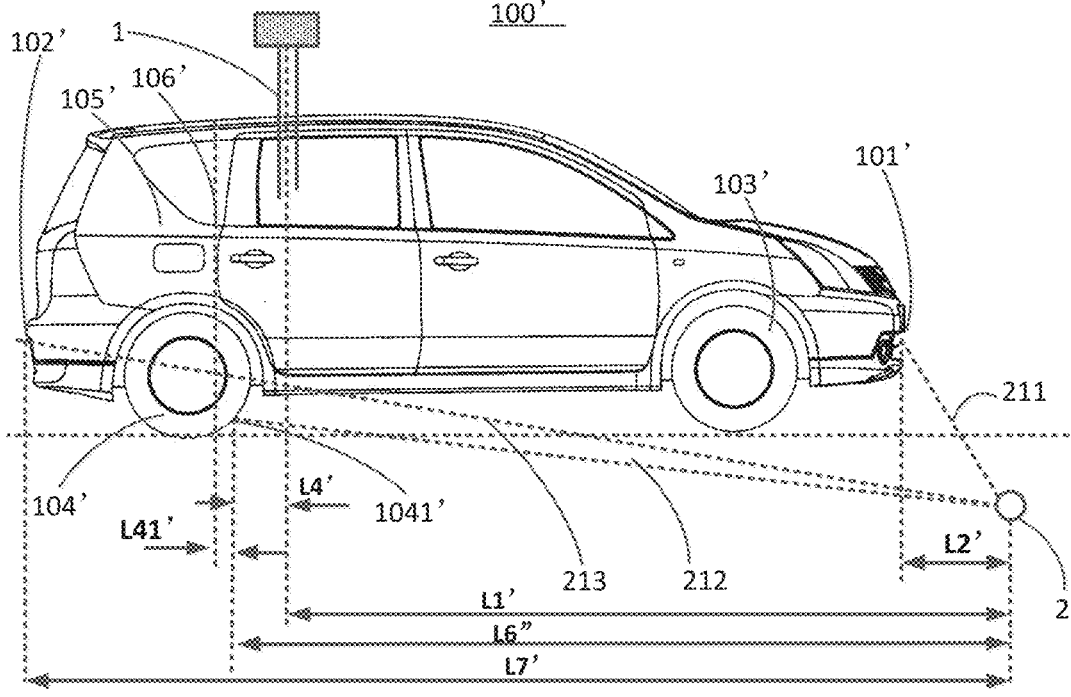
FIG. 8 shows a schematic diagram of a principle of scanning a trunk when an inspected hatchback passes through a scanning device of a vehicle safety inspection system according to an exemplary embodiment of the present disclosure.

FIG. 7 shows a three-dimensional schematic diagram of a hatchback according to an exemplary embodiment of the present disclosure. FIG. 8 shows a schematic diagram of a principle of scanning a trunk when an inspected hatchback passes through a scanning device of a vehicle safety inspection system according to an exemplary embodiment of the present disclosure.

Referring to FIG. 7 and FIG. 8, in an embodiment, a vehicle 100' is the hatchback and includes a front end section 101', a rear end section 102', a front wheel 103', a rear wheel 104', and a trunk 105'. The trunk 105' has a front end 106'. A distance L41' between a front wheel rim 1041' of the rear wheel 104' and the front end 106' of the trunk 105', and a distance L42' between a rear wheel rim 1042' of the rear wheel 104' and the front end 106' of the trunk 105', are fixed. It may be preset that: the first laser 211 emitted by the emitter of the laser sensor is used to measure a first distance L2' between the front end section 101' of the vehicle 100' and the laser sensor in the travelling direction, the second laser 212 emitted by the emitter of the laser sensor is used to measure a second distance L6" between the front wheel rim 1041' of the rear wheel 104' of the vehicle 100' and the laser sensor in the travelling direction, and the third laser 213 emitted by the emitter of the laser sensor is used to measure a third distance L7' between the rear end section 102' of the vehicle 100 and the laser sensor in the travelling direction.

It may be understood that, unlike the notchback shown in FIG. 4, in the hatchback shown in FIG. 7, the front wheel rim 1041' of the rear wheel 104' is located downstream of the front end 106' of the trunk 105' in a forward travelling direction of the vehicle. That is to say, taking the forward travelling direction of the vehicle as a reference, the distance L41' between the front wheel rim 1041' of the rear wheel 104' of the hatchback and the front end 106' of the trunk 105' is a negative value. In a case of the hatchback, the controller may determine whether the front end 16' of the trunk 105' reaches the scanning region 16 of the scanning device 1 according to a distance between the front wheel rim 1041' of the rear wheel 104' and the scanning region 16 defined by the radiation beam 12 emitted by the scanning device 1, and may control the scanning device 1 to accurately scan and inspect the trunk 105'.

As shown in FIG. 1, FIG. 7, and FIG. 8, in a case that the position of the front wheel rim 1041' of the rear wheel 104' of the hatchback in the inspection region 200 is measured, the distance L4' between the front end 106' of the trunk 105' and the scanning region 16 (or the radiation beam 12) of the scanning device 1 is:

L4'=L6"−L41', where L41' may be a negative value, e.g., L41'=−5 centimeters.

In an exemplary embodiment, as shown in FIG. 7 and FIG. 8, if the recognition module determines that the vehicle 100' is the hatchback and the predetermined part is set as the front wheel rim 1041' of the hatchback, the selection module selects the first distance to be within a range of (−10) to 10 centimeters, preferably approximately −5 centimeters. That is to say, in a case that the distance L4 between the front wheel rim 1041' located upstream of the scanning device 1 in the travelling direction F and the radiation beam 12 of the scanning device 1 is less than (−10) to 10 centimeters, preferably less than −5 centimeters, which is indicated that the front end 106' of the trunk 105' enters the scanning region 16, the controller controls the scanning device 1 to scan and inspect the trunk 105'.

In an exemplary embodiment, if the recognition module determines that the vehicle is the hatchback and the predetermined part is set as the rear wheel rim 1042' of the hatchback, the selection module selects the first distance to be within a range of 30 to 50 centimeters, preferably approximately 35 centimeters. That is to say, in a case that the distance L4 between the rear wheel rim 1042 located upstream of the scanning device 1 in the travelling direction F and the radiation beam 12 of the scanning device 1 is less than 30 to 50 centimeters, preferably less than 35 centimeters, which is indicated that the front end 106' of the trunk 105 enters the scanning region 16, the controller controls the scanning device 1 to scan and inspect the trunk 105'.

In an exemplary embodiment, referring to FIG. 5, the controller is further used to start to control the position sensor 2 to detect the position of the rear wheel rim 1041 or front wheel rim 1042 of the rear wheel 104, when the position sensor 2 detects that the front end section 101 of the vehicle 100 is more than 200 centimeters leaving away from the radiation beam 12 of the scanning device 1 in the travelling direction F, i.e., (L1−L2)>200 centimeters, which is indicated that the front wheel 103 of the vehicle 100 has passed through the scanning device 1. In this way, the position sensor 2 may be prevented from mistakenly measuring the position of the front wheel 103.

In an exemplary embodiment, referring to FIG. 1, and FIG. 4 to FIG. 6, the feature of the trunk 105 includes a length L3 of the trunk, and the predetermined part of the vehicle 100 is set as the rear end section 104 of the vehicle. In a case that a distance L5 (=L7−L1) between the rear end section 104 of the vehicle 100 located upstream of the scanning device 1 in the travelling direction F and the radiation beam 102 of the scanning device 1 is less than the second distance, the controller controls the scanning device 1 to scan and inspect the trunk 105. Furthermore, if the recognition module determines that the vehicle 100 is the notchback, the selection module selects the second distance to be within a range of 90 to 110 centimeters, preferably approximately 100 centimeters. It may be understood that the second distance is roughly equal to the length L3 of the trunk 105 of the notchback.

In an exemplary embodiment, referring to FIG. 1, FIG. 7 to FIG. 8, the feature of the trunk 105' includes a length L3' of the trunk, and the predetermined part of the vehicle 100' is set as the rear end section 104' of the vehicle. In a case that a distance (L7'−L1') between the rear end section 104' of the vehicle 100' located upstream of the scanning device 1 in the travelling direction F and the radiation beam 102 of the scanning device 1 is less than the second distance, the controller controls the scanning device 1 to scan and inspect the trunk 105'. Furthermore, if the recognition module determines that the vehicle 100 is the hatchback, the selection module selects the second distance to be within a range of 70 to 90 centimeters, preferably approximately 80 centimeters. It may be understood that the second distance is roughly equal to the length L3' of the trunk 105' of the hatchback.

In an exemplary embodiment, the position sensor 2 is further used to measure a traveling speed of the vehicle 100, and the controller controls a scanning frequency of the scanning device 1 according to the traveling speed. In this way, it may be ensured that the scanning frequency of the scanning device 1 corresponds to the traveling speed of the vehicle, thereby obtaining a stable scanning image. Furthermore, during a process of scanning and imaging the vehicle 100 or the vehicle 100', the controller adjusts a proportion of the scanning image formed by the scanning device 1 according to the traveling speed, so as to obtain a clearer scanning image.

FIG. 9 shows a block diagram of a safety inspection method according to an exemplary embodiment of the present disclosure.

According to embodiments of another aspect of the present disclosure, there is provided a safety inspection method of inspecting a trunk of a vehicle by using the vehicle safety inspection system described in any one of the above-mentioned embodiments, including following steps: step S100, acquiring a physical object image of the vehicle 100 being driven into the inspection region 200 through the imaging device 3; recognizing the physical object image through the recognition module and determining a type of the vehicle according to the recognized physical object image, e.g., recognizing whether the vehicle is a notchback or a hatchback; selecting a feature of the trunk 105 of the vehicle 100 according to the determined type of the vehicle through the selection module; detecting a position of the predetermined part of the vehicle 100 in the inspection region 200 through the position sensor 2; and in a case that the front end 106 of the trunk 105 of the vehicle is determined to enter the scanning region 16 of the scanning device 1 according to the selected feature and the position of the vehicle 100, controlling the scanning device 1 to scan and inspect the trunk 106 through the controller.

In an exemplary embodiment, in a case that the position sensor 2 detects that the rear end section 102 of the vehicle 100 leaves the scanning region 16 formed by the radiation beam 12 emitted by the scanning device 1, the controller controls the scanning device 1 to stop scanning and inspection.

According to the vehicle safety inspection system of embodiments of the present disclosure, the recognition module may recognize the type of the vehicle 100 and select the feature of the trunk 105 of the vehicle. In a case that the front end 106 of the trunk 105 of the vehicle is determined to enter the scanning region 16 of the scanning device 1 according to the selected feature and the position of the vehicle 100, the controller controls the scanning device 1 to scan and inspect the trunk 105. In this way, the scanning device 1 only performs a safety inspection on the trunk 105 of the vehicle 100, and different scanning and inspection timings may be selected according to different vehicle types. In a case that a driver and a passenger of the vehicle 100 do not need to get off the vehicle and the vehicle does not need to stop travelling, scanning and inspection of the vehicle may be achieved, thereby improving a safety inspection efficiency. In a case that the position sensor 2 detects that the rear end section 102 of the vehicle 100 leaves the scanning region 16 of the scanning device 1, the controller controls the scanning device 1 to stop scanning and inspection in preparation for a next safety inspection operation.

In an embodiment, referring to FIG. 1, FIG. 4, and FIG. 6, if the type of the vehicle is determined to be the notchback and the predetermined part is set as the rear wheel rim 1042 of the rear wheel 104 of the vehicle 100 lower than the chassis of the vehicle, in a case that a distance between the rear wheel rim 1042 located upstream of the scanning device 1 in the travelling direction F and the radiation beam of the scanning device 1 is less than 40 to 60 centimeters, preferably approximately 45 centimeters, which is indicated that the front end 106 of the trunk 105 enters the scanning region 16, the controller controls the scanning device 1 to scan and inspect the trunk 105.

In an embodiment, referring to FIG. 1, FIG. 4, and FIG. 5, if the type of vehicle is determined to be the notchback and the predetermined part is set as the front wheel rim 1041 of the rear wheel 104 of the vehicle 100 lower than the chassis of the vehicle, in a case that a distance between the front wheel rim 1041 located upstream of the scanning device 1 in the travelling direction F and the radiation beam 12 of the scanning device 1 is less than 5 to 25 centimeters, preferably approximately 10 centimeters, which is indicated that the front end 106 of the trunk 105 enters the scanning region 16, the controller controls the scanning device 1 to scan and inspect the trunk 105.

In an embodiment, referring to FIG. 1 and FIG. 7, if the type of the vehicle is determined to be the hatchback and the predetermined part is set as the rear wheel rim 1042' of the rear wheel 104' of the vehicle 100' lower than the chassis of the vehicle, in a case that a distance between the rear wheel rim 1042' located upstream of the scanning device 1 in the travelling direction F and the radiation beam of the scanning device 1 is less than 30 to 50 centimeters, preferably approximately 35 centimeters, the controller controls the scanning device 1 to scan and inspect the trunk 105'.

In an embodiment, referring to FIG. 1, FIG. 6, and FIG. 7, if the type of the vehicle is determined to be the notchback and the predetermined part is set as the front wheel rim 1041' of the rear wheel 1042' of the vehicle 100' lower than the chassis of the vehicle, in a case that a distance between the front wheel rim 1041' located upstream of the scanning device 1 in the travelling direction F and the radiation beam of the scanning device 1 is less than (−10) to 10 centimeters, preferably approximately −5 centimeters, the controller controls the scanning device 1 to scan and inspect the trunk 105'.

In an embodiment, referring to FIG. 1, and FIG. 4 to FIG. 6, if the type of the vehicle is determined to be the notchback and the predetermined part is set as the rear end section 102 of the vehicle 100, in a case that a distance between the rear end section 102 located upstream of the scanning device 1 in the travelling direction F and the radiation beam of the scanning device 1 is less than 90 to 110 centimeters, preferably approximately 100 centimeters, the controller controls the scanning device 1 to scan and inspect the trunk 105.

In an embodiment, referring to FIG. 1, and FIG. 7 to FIG. 8, if the type of the vehicle is determined to be the hatchback and the predetermined part is set as the rear end section 102' of the vehicle 100', in a case that a distance between the rear end section 102' located upstream of the scanning device 1 in the travelling direction F and the radiation beam of the scanning device 1 is less than 80 to 100 centimeters, preferably approximately 90 centimeters, the controller controls the scanning device 1 to scan and inspect the trunk 105'.

According to the vehicle safety inspection system and the safety inspection method of embodiments of the present disclosure, a safety inspection may be performed on the trunk of the vehicle without stopping the vehicle and the driver getting off the vehicle when the vehicle is about to enter a place such as a public security, a justice, a prison, a customs, a frontier inspection, an anti-smuggling and anti-narcotic, an airport, an important government organ, an important security agency, a military base, a consulate, an important person residence passageway, and an important conference hall, so as to inspect whether a prohibited article such as a drug, a smuggled article, a control tool, a gun, a flammable and explosive article is hidden in the trunk. The scanning device only emits a radiation beam in a process of inspecting the trunk, thereby achieving avoidance for the driver and other passengers in the vehicle, ensuring that the driver and other passengers in the vehicle are prevented from being radiated, and improving the safety.

According to the vehicle safety inspection system and the safety inspection method of embodiments of the present disclosure, in a case that the front end of the trunk of the vehicle is determined to enter the scanning region of the scanning device according to the selected feature and the position of the vehicle, the controller controls the scanning device to scan and inspect the trunk. In this way, the scanning device selects different scanning and inspection timings according to different vehicle types, which achieves accurate judgment of the position of the trunk and enables the scanning device to quickly emit the radiation beam and stop emitting the radiation beam, and the vehicle may continuously enter the inspection region. The position sensor is used for determining the position of the vehicle, which is easy to install and cost-effective in practical applications.

Those skilled in the art may understand that the embodiments described above are exemplary, and may be modified by those skilled in the art, and the structures described in various embodiments may be freely combined without conflict in structure or principle.

Although the present disclosure has been described in combination with the accompanying drawings, the embodiments disclosed in the accompanying drawings are intended to illustrate the preferred embodiments of the present disclosure, and are not to be understood as limiting the present disclosure. Although some embodiments of the inventive concept of the present disclosure have been shown and explained, those of ordinary skill in the art will understand that these embodiments may be changed without departing from the principle and spirit of the overall utility model concept of the present disclosure, and the scope of the present disclosure is defined by the claims and their equivalents.

What is claimed is:

1. A vehicle safety inspection system, comprising:
   a scanning device mounted in an inspection region and configured to scan a detected vehicle;
   an imaging device configured to acquire a physical object image of the vehicle being driven into the inspection region;

a recognition module configured to recognize the physical object image and determine a type of the vehicle according to a recognized physical object image;

a selection module configured to select a feature of a trunk of the vehicle according to a determined type of the vehicle;

a position sensor configured to detect a position of a predetermined part of the vehicle in the inspection region; and a controller configured to control the scanning device to scan and inspect the trunk in a case that a front end section of the trunk of the vehicle is determined to enter a scanning region of the scanning device according to a selected feature and the position of the vehicle, wherein determining the type of the vehicle comprises determining whether the vehicle is a hatchback or a notchback, wherein the predetermined part of the vehicle is set as a front wheel rim or a rear wheel rim of a rear wheel lower than a chassis of the vehicle, and the feature of the trunk comprises a first distance of the front end of the trunk beyond the front wheel rim or the rear wheel rim in a travelling direction of the vehicle, and in a case that a distance between the predetermined part located upstream of the scanning device in the travelling direction and a radiation beam of the scanning device is less than the first distance, the controller controls the scanning device to scan and inspect the trunk.

2. The vehicle safety inspection system according to claim 1, wherein the controller is further configured to control the scanning device to stop scanning and inspection in a case that the position sensor detects that a rear end section of the vehicle leaves the scanning region of the scanning device.

3. The vehicle safety inspection system according to claim 1, wherein, when the recognition module determines that the vehicle is the notchback and the predetermined part is set as the front wheel rim, the selection module selects the first distance to be in a range of 5 to 25 centimeters, and when the recognition module determines that the vehicle is the notchback and the predetermined part is set as the rear wheel rim, the selection module selects the first distance to be in a range of 40 to 60 centimeters.

4. The vehicle safety inspection system according to claim 1, wherein, when the recognition module determines that the vehicle is the hatchback and the predetermined part is set as the front wheel rim, the selection module selects the first distance to be in a range of (−10) to 10 centimeters, and when the recognition module determines that the vehicle is the hatchback and the predetermined part is set as the rear wheel rim, the selection module selects the first distance to be in a range of 30 to 50 centimeters.

5. The vehicle safety inspection system according to claim 1, wherein the controller is further configured to start to control the position sensor to detect a position of the rear wheel rim or the front wheel rim of the rear wheel when the position sensor detects that a front end section of the vehicle is more than 200 centimeters leaving away from the radiation beam of the scanning device in the travelling direction.

6. The vehicle safety inspection system according to claim 1, wherein the position sensor comprises one of a region laser scanner, a multi-line laser sensor, and a single-line laser sensor, the position sensor is further configured to measure a traveling speed of the vehicle, the controller controls a scanning frequency of the scanning device according to the traveling speed, the controller adjusts a proportion of a scanned image formed by the scanning device according to the traveling speed.

7. The vehicle safety inspection system according to claim 1, wherein the scanning device comprises:

two upright frames oppositely disposed on two sides of the inspection region; and a radiation source and an array detector respectively disposed on the two upright frames; and two shielding walls respectively disposed on the upright frames to shield a radiation line from the radiation source.

8. A safety inspection method of inspecting a vehicle by using the vehicle safety inspection system according to claim 1, comprising:

acquiring the physical object image of the vehicle being driven into the inspection region;

recognizing the physical object image and determining the type of the vehicle according to the recognized physical object image;

selecting the feature of the trunk of the vehicle according to the determined type of the vehicle;

detecting the position of the predetermined part of the vehicle in the inspection region; and controlling, in a case that the front end of the trunk of the vehicle is determined to enter the scanning region of the scanning device according to the selected feature and the position of the vehicle, the scanning device to scan and inspect the trunk.

9. The security inspection method according to claim 8, wherein in a case that the position sensor detects that a rear end section of the vehicle leaves the scanning region of the scanning device, the scanning device is controlled to stop scanning and inspection.

10. The safety inspection method according to claim 8, wherein when the type of the vehicle is determined to be a notchback and the predetermined part is set as a rear wheel rim of a rear wheel of the vehicle lower than a chassis of the vehicle, in a case that a distance between the rear wheel rim located upstream of the scanning device in a travelling direction and a radiation beam of the scanning device is less than 40 to 60 centimeters, the controller controls the scanning device to scan and inspect the trunk.

11. The safety inspection method according to claim 8, wherein when the type of the vehicle is determined to be a notchback and the predetermined part is set as a front wheel rim of a rear wheel of the vehicle lower than a chassis of the vehicle, in a case that a distance between the front wheel rim located upstream of the scanning device in a travelling direction and a radiation beam of the scanning device is less than 5 to 25 centimeters, the controller controls the scanning device to scan and inspect the trunk.

12. The safety inspection method according to claim 8, wherein when the type of the vehicle is determined to be a hatchback and the predetermined part is set as a rear wheel rim of a rear wheel of the vehicle lower than a chassis of the vehicle, in a case that a distance between the rear wheel rim located upstream of the scanning device in a travelling direction and a radiation beam of the scanning device is less than 30 to 50 centimeters, the controller controls the scanning device to scan and inspect the trunk.

13. The safety inspection method according to claim 8, wherein when the type of the vehicle is determined to be a notchback and the predetermined part is set as a front wheel rim of a rear wheel of the vehicle lower than a chassis of the vehicle, in a case that a distance between the front wheel rim located upstream of the scanning device in a travelling direction and a radiation beam of the scanning device is less than (−10) to 10 centimeters, the controller controls the scanning device to scan and inspect the trunk.

14. A vehicle safety inspection system, comprising:

a scanning device mounted in an inspection region and configured to scan a detected vehicle;

an imaging device configured to acquire a physical object image of the vehicle being driven into the inspection region;

a recognition module configured to recognize the physical object image and determine a type of the vehicle according to a recognized physical object image;

a selection module configured to select a feature of a trunk of the vehicle according to a determined type of the vehicle;

a position sensor configured to detect a position of a predetermined part of the vehicle in the inspection region; and a controller configured to control the scanning device to scan and inspect the trunk in a case that a front end section of the trunk of the vehicle is determined to enter a scanning region of the scanning device according to a selected feature and the position of the vehicle, wherein determining the type of the vehicle comprises determining whether the vehicle is a hatchback or a notchback, wherein the feature of the trunk comprises a length of the trunk, and the predetermined part of the vehicle is set as a rear end section of the vehicle, and in a case that a distance between the rear end section of the vehicle located upstream of the scanning device in a travelling direction and a radiation beam of the scanning device is less than a second distance, the controller controls the scanning device to scan and inspect the trunk.

15. The vehicle safety inspection system according to claim 14, wherein when the recognition module determines that the vehicle is the notchback, the selection module selects the second distance to be in a range of 90 to 110 centimeters.

16. The vehicle safety inspection system according to claim 14, wherein when the recognition module determines that the vehicle is the hatchback, the selection module selects the second distance to be in a range of 70 to 90 centimeters.

17. A safety inspection method of inspecting a vehicle by using the vehicle safety inspection system according to claim 14, comprising:

acquiring the physical object image of the vehicle being driven into the inspection region;

recognizing the physical object image and determining the type of the vehicle according to the recognized physical object image;

selecting the feature of the trunk of the vehicle according to the determined type of the vehicle;

detecting the position of the predetermined part of the vehicle in the inspection region; and controlling, in a case that the front end of the trunk of the vehicle is determined to enter the scanning region of the scanning device according to the selected feature and the position of the vehicle, the scanning device to scan and inspect the trunk.

18. The safety inspection method according to claim 17, wherein when the type of the vehicle is determined to be a notchback and the predetermined part is set as a rear end section of the vehicle, in a case that a distance between the rear end section located upstream of the scanning device in a travelling direction and a radiation beam of the scanning device is less than 90 to 110 centimeters, the controller controls the scanning device to scan and inspect the trunk.

19. The safety inspection method according to claim 17, wherein when the type of vehicle is determined to be a hatchback and the predetermined part is set as a rear end section of the vehicle, in a case that a distance between the rear end section located upstream of the scanning device in a travelling direction and a radiation beam of the scanning device is less than 80 to 100 centimeters, the controller controls the scanning device to scan and inspect the trunk.

* * * * *